US008050171B2

(12) United States Patent
Aoki et al.

(10) Patent No.: US 8,050,171 B2
(45) Date of Patent: Nov. 1, 2011

(54) INFORMATION RECORDING/REPRODUCING DEVICE HAVING HEAD COVERING BY RESISTANCE ELEMENT

(75) Inventors: Shinya Aoki, Yokohama (JP); Koichi Kubo, Yokohama (JP); Junichi Ito, Yokohama (JP); Junichi Akiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 833 days.

(21) Appl. No.: 12/051,613

(22) Filed: Mar. 19, 2008

(65) Prior Publication Data

US 2008/0231986 A1   Sep. 25, 2008

(30) Foreign Application Priority Data

Mar. 20, 2007 (JP) ................... 2007-073631

(51) Int. Cl.
*G11B 9/00* (2006.01)
(52) U.S. Cl. ...................................... 369/126
(58) Field of Classification Search .............. None
See application file for complete search history.

(56) References Cited

U.S. PATENT DOCUMENTS

| 5,047,649 | A | * | 9/1991 | Hodgson et al. | ............ 250/492.2 |
| 5,574,279 | A | * | 11/1996 | Ikeda et al. | ............ 850/56 |
| 7,406,020 | B2 | * | 7/2008 | Hong et al. | ............ 369/126 |
| 2003/0218960 | A1 | * | 11/2003 | Albrecht et al. | ............ 369/126 |
| 2005/0099713 | A1 | * | 5/2005 | Molstad et al. | ............ 360/48 |
| 2006/0017020 | A1 | * | 1/2006 | Usa et al. | ............ 250/492.23 |
| 2007/0047418 | A1 | | 3/2007 | Kubo et al. | ............ 369/101 |
| 2007/0047427 | A1 | * | 3/2007 | Cherubini et al. | ............ 369/126 |
| 2007/0053101 | A1 | | 3/2007 | Akiyama | ............ 360/121 |
| 2007/0133358 | A1 | | 6/2007 | Kubo et al. | ............ 369/13.38 |
| 2007/0274193 | A1 | | 11/2007 | Akiyama et al. | ............ 369/126 |
| 2008/0247300 | A1 | * | 10/2008 | Albrecht et al. | ............ 369/126 |

FOREIGN PATENT DOCUMENTS

| JP | 2006-12385 | 1/2006 |
| JP | 2007-42188 | 2/2007 |

OTHER PUBLICATIONS

Yoshida, et al., "Reversible Electrical Modification on Conductive Polymer for Proximity Probe Data Storage", Institute of Phnysics Publishing, Nanotechnology 16 (2005), pp. 2516-2520.
Gotoh, et al., "Minimal Phase-Change Marks Produced in Amorphous $Ge_2Sb_2Te_5$ Films", Japanese Journal of Applied Physics, vol. 43, No. 6B 2004, pp. L818-L821.

(Continued)

*Primary Examiner* — Paul Huber
(74) *Attorney, Agent, or Firm* — Ohlandt, Greeley, Ruggiero & Perle, L.L.P.

(57) ABSTRACT

An information recording/reproducing device according to an example of the present invention includes a first head and a second head each having a conductive region formed of a conductive material, a recording medium having a data area from which data is read by the first head, and a servo burst area from which a servo burst signal is read by the second head, a driver for positioning the first head and the recording medium based on the servo burst signal, and a resistance element for covering a surface of the conductive region of the second head.

20 Claims, 13 Drawing Sheets

OTHER PUBLICATIONS

Sawa, et al., "*Hysteretic Current-Voltage Characteristics and Resistance Switching at a Rectifying Ti/Pr$_{0.7}$Ca$_{0.3}$ MnO3 Interface*", Applied Physics Letters, vol. 85, No. 18, Nov. 1, 2004, pp. 4073-4075.

Vettiger, et al., "*The 'Millipede'—Nanotechnology Entering Data Storage*", IEEE Transactions on Nanotechnology, vol. 1, No. 1, Mar. 2002, pp. 39-55.

Vettiger, et al., "*Thousands of Microcantilevers for Highly Parallel and Ultra-dense Data Storage*", IEEE, 2003, pp. 32.1.1-32.1.4.

U.S. Appl. No. 11/954,370, filed Dec. 12, 2007.
U.S. Appl. No. 11/895,378, filed Aug. 24, 2007.
U.S. Appl. No. 12/050,101, filed Mar. 19, 2008, Kohichi Kubo.

* cited by examiner

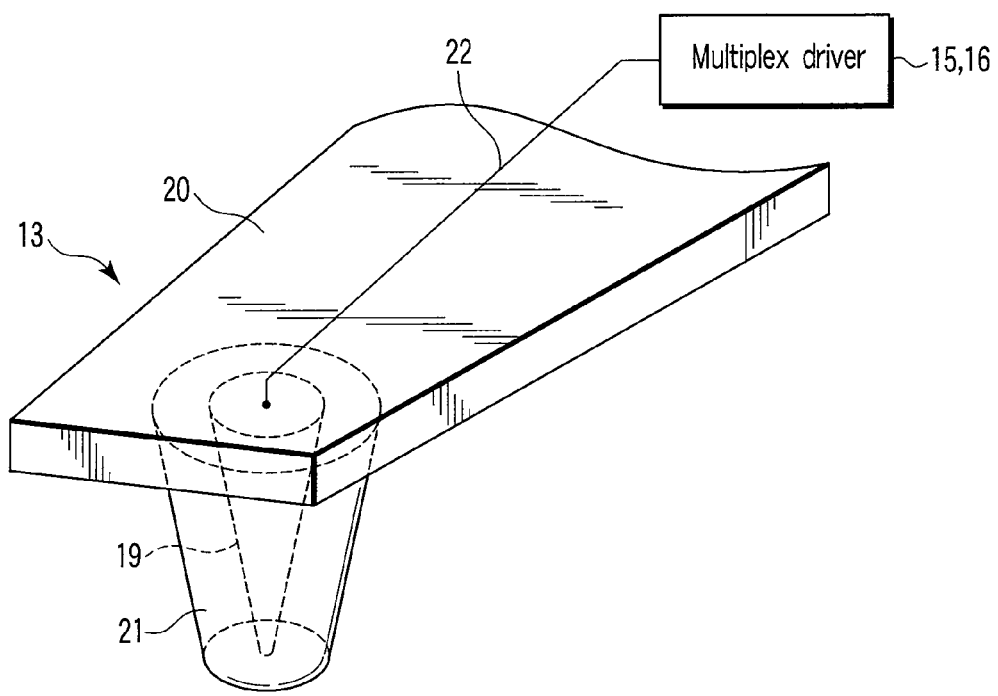
F I G. 4
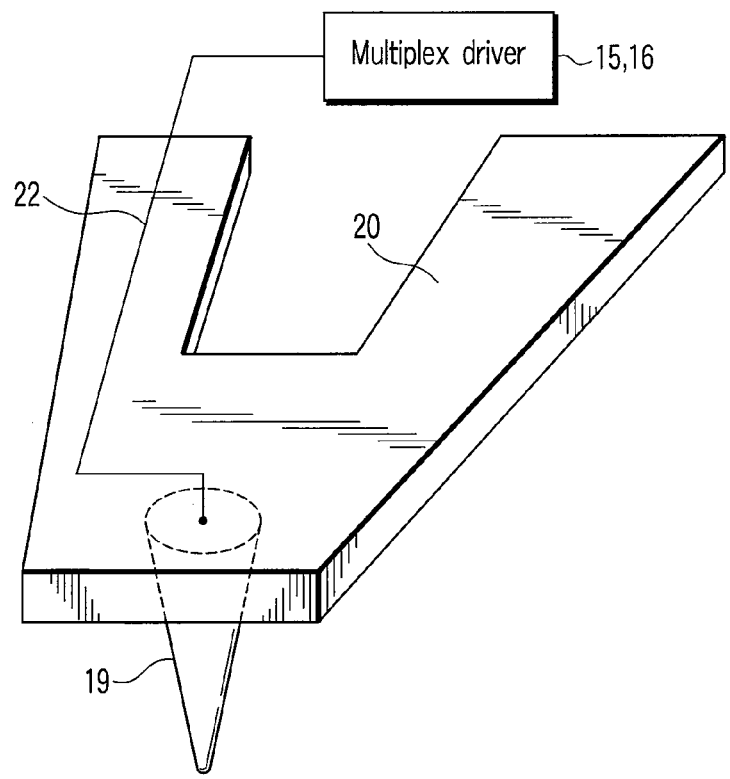
F I G. 5

Modified examples of probe

| | Data area, address area | Servo burst area |
|---|---|---|
| Embodiment | 19 (cone) | 21, 19, Lower end face, 21, 19 |
| First modified example | 19 (cone) | 21, 19, Lower end face, 21, 19 |
| Second modified example | 19 (cylinder) | 21, 19, Lower end face, 21, 19 |
| Third modified example | 19 (cylinder) | 21, 19, Lower end face, 21, 19 |
| Fourth modified example | 19 (rectangular) | 21, 19, 21 |

FIG. 7

Modified examples of probe

| | Data area, address area | Servo burst area |
|---|---|---|
| Fifth modified example |  |  |
| Sixth modified example |  |  |
| Seventh modified example |  |  |
| Eighth modified example |  |  |

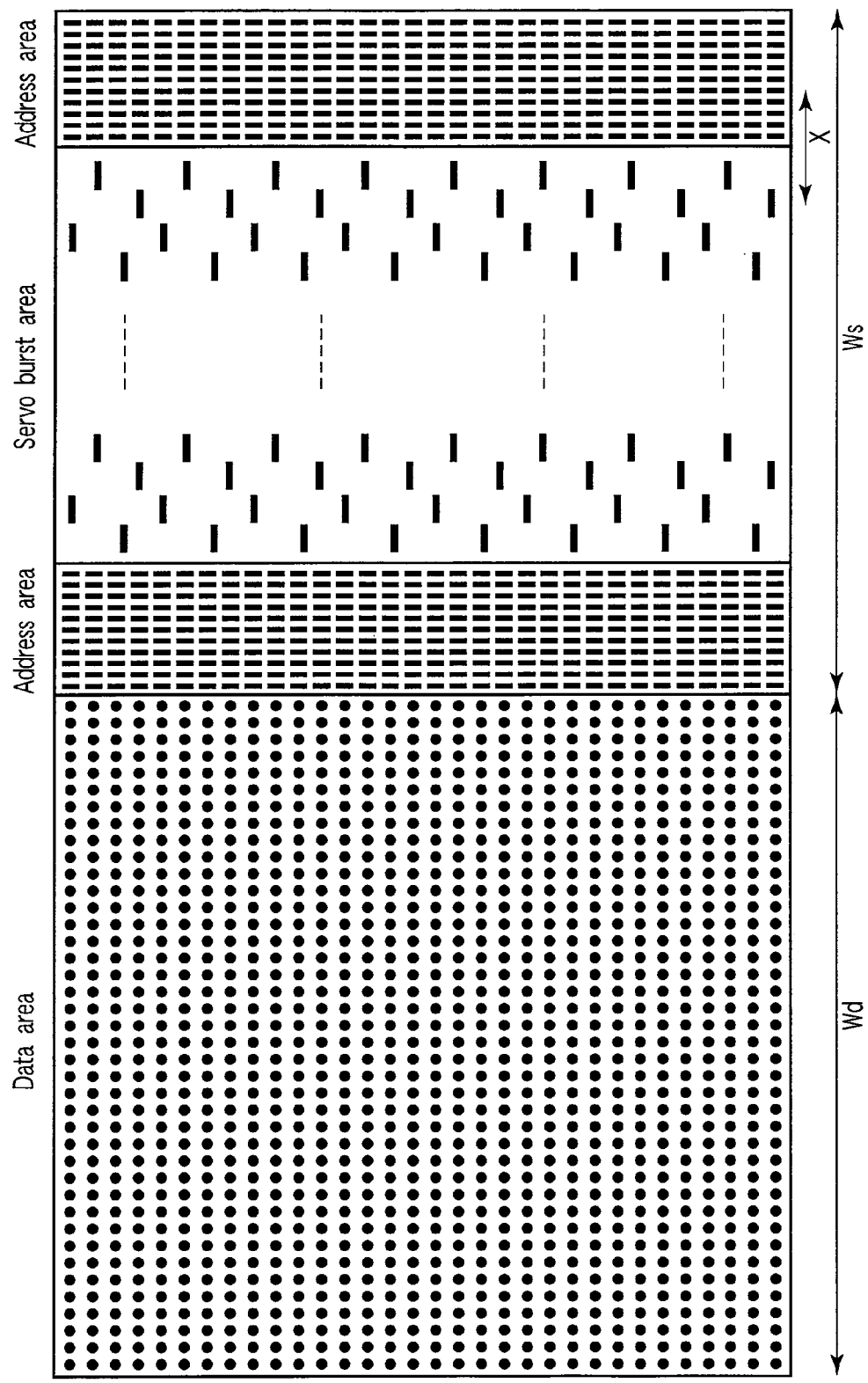
F I G. 13

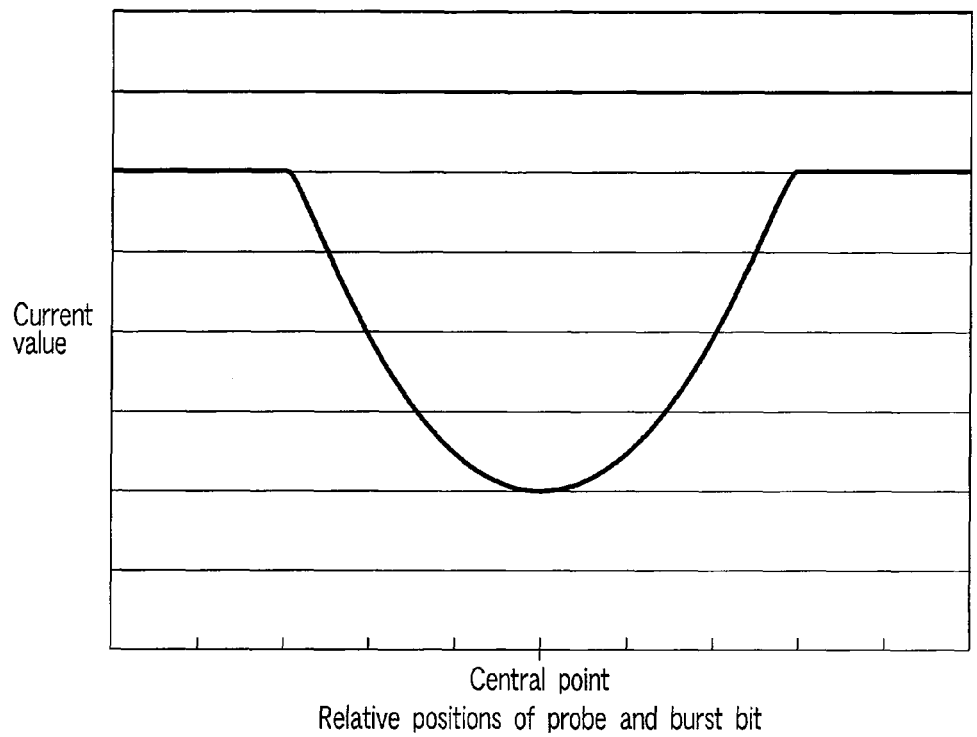
Central point
Relative positions of probe and burst bit
F I G. 16
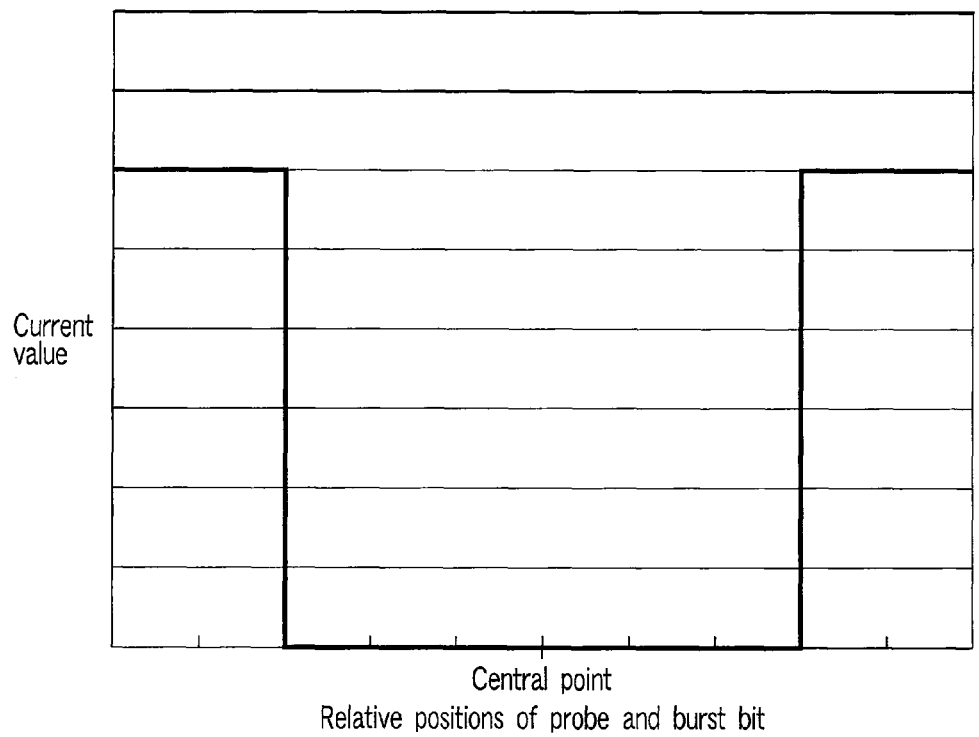
Central point
Relative positions of probe and burst bit
F I G. 17

INFORMATION RECORDING/REPRODUCING DEVICE HAVING HEAD COVERING BY RESISTANCE ELEMENT

CROSS-REFERENCE TO RELATED APPLICATIONS

This application is based upon and claims the benefit of priority from prior Japanese Patent Application No. 2007-073631, filed Mar. 20, 2007, the entire contents of which are incorporated herein by reference.

BACKGROUND OF THE INVENTION

1. Field of the Invention

The invention relates to an information recording/reproducing device for recording and reproducing information in a recording medium by using a conductive probe.

2. Description of the Related Art

Recently, small-sized portable appliances are spreading widely around the world, and as high-speed information transmission networking has notably advanced, the demand is rapidly mounting for nonvolatile memories of small size and large capacity. Among them, the NAND-type flash memory and a small-sized hard disk drive (HDD) have rapidly advanced in recording density, and are forming a large market.

Against this background, new memories intended to substantially surpass the limits of recording density are being developed, and results of research and development of recording and reproducing systems based on new theories have been recently reported inside and outside Japan.

One of the most noteworthy recording and reproducing systems is the resistive RAM (ReRAM) making use of resistance changes due to application of current pulses to a recording layer (see, for example, T. Gotoh, K. Sugawara and K. Tanaka, Jpn. J. Appl. Phys., 43, 6B, 2004, L818, and A. Sawa, T. Fuji, M. Kawasaki and Y. Tokura, Appl. Phys. Lett., 85, 18, 4073, 2004).

A recording layer is composed of, for example, a two-element metal oxide such as $TiO_2$, $Cu_xO$, and $Fe_2O_3$, and a composite oxide such as $Pr_{(1-x)}Ca_xMnO_3$, $SrTiO_3$ doped with Cr, and $SrZrO_3$ doped with Cr. A composition of forming a recording layer from a metal chalcogenide compound such as $Cu_2S$ is called a programmable metallization cell (PMC).

In the ReRAM, by applying a voltage to the recording layer, a current passage of low resistance and substantially having a metallic electrical conductivity is formed in the recording layer. As a result, the resistance of the recording layer drops. If such current passage is not formed, on the other hand, the recording layer is an insulator or a semiconductor, and its resistance is high.

The difference in such resistances, that is, the on/off ratio, reaches as high as $10^3$ or more.

Therefore, when a reading current is applied to the recording layer, a voltage difference according to the resistance difference of the recording layer is generated, and by detecting this voltage difference, reproduction at high sensitivity may be realized.

In this recording and reproducing system, by reducing the size of the recording layer, the current necessary for recording is decreased, which contributes to advancement of density.

There are other examples of memories suited to recording and reproducing at high density, such as probe memories having a cantilever array formed by the technology of microelectromechanical systems (MEMS) (see, for example, P. Vettiger, G. Cross, M. Despont, U. Drechsler, U. Durig, B. Gotsmann, W. Haberle, M. A. Lants, H. E. Rothuizen, R. Stutz and G. K. Binning, IEEE Trans. Nanotechnology 1, 39 (2002), and P. Vettiger, T. Albrecht, M. Despont, U. Drechsler, U. Durig, B. Gotsmann, D. Jubin, W. Haberle, M. A. Lants, H. E. Rothuizen, R. Stutz, D. Wiesman and G. K. Binning, P. Bachtold, G. Cherubini, C. Hagleitner, T. Loeliger, A. Pantazi, H. Pozidis and E. Eleftheriou, in Technical Digest, IEDMO3, pp. 763-766).

A major feature of the probe memory is that the recording density can be enhanced outstandingly because wiring is not needed in each recording area for recording bit data.

In the probe memory, the probe is set in contact with the recording layer composed of, for example, an organic polymer material, and information is thermally recorded topographically in part (bit) of the recording layer. When reproducing, the resistance change of the cantilever resistor occurring depending on presence or absence of bit recording is detected.

In the driving system of such probe memory, mainly, about 1,000 cantilevers (probes) are provided on one chip, and they are driven in parallel. The cantilevers on one chip can be formed simultaneously by the MEMS technology.

According to a demonstration by a single probe, the recording density of the probe memory has been already proved to be as high as $1.14\,Tb/in^2$, far higher than the recording density of a hard disk drive (HDD).

The probe memory is expected to be used as a mobile storage in the future, but assuming application in a memory card, a great demerit is that the transfer speed is less than $1/10$ as compared with the existing HDD. By thermal recording, another problem is the possibility of increase of power consumption along with enhancement of density.

Accordingly, instead of thermal topographic recording in polymer, the ReRAM recording and reproducing system is expected to be capable of recording and reproducing at high speed and at lower power consumption, and when it is applied to the information recording/reproducing device such as HDD, an ideal memory characterized by high speed, low power consumption, and high density may be realized.

In this case, however, a probe position control system of high precision must be established.

BRIEF SUMMARY OF THE INVENTION

An information recording/reproducing device according to an aspect of the present invention comprises a first head and a second head having a conductive region formed of a conductive material, a recording medium having a data area from which data is read by the first head, and a servo burst area from which a servo burst signal is read by the second head, a driver for positioning the first head and the recording medium based on the servo burst signal, and a resistance element for covering a surface of the conductive region of the second head.

BRIEF DESCRIPTION OF THE SEVERAL VIEWS OF THE DRAWING

FIG. 4 is a diagram of a first example of a probe for a servo burst area;
FIG. 5 is a diagram of a second example of the probe for a data area;

FIG. 7 is a diagram of modified examples of the probe;

FIG. 13 is a diagram of a modified example of area divisions on the recording medium;

FIG. 16 is a diagram of a detection signal by a probe with a resistance element; and FIG. 17 is a diagram of a detection signal by a probe without a resistance element.

DETAILED DESCRIPTION OF THE INVENTION

Figure 1:
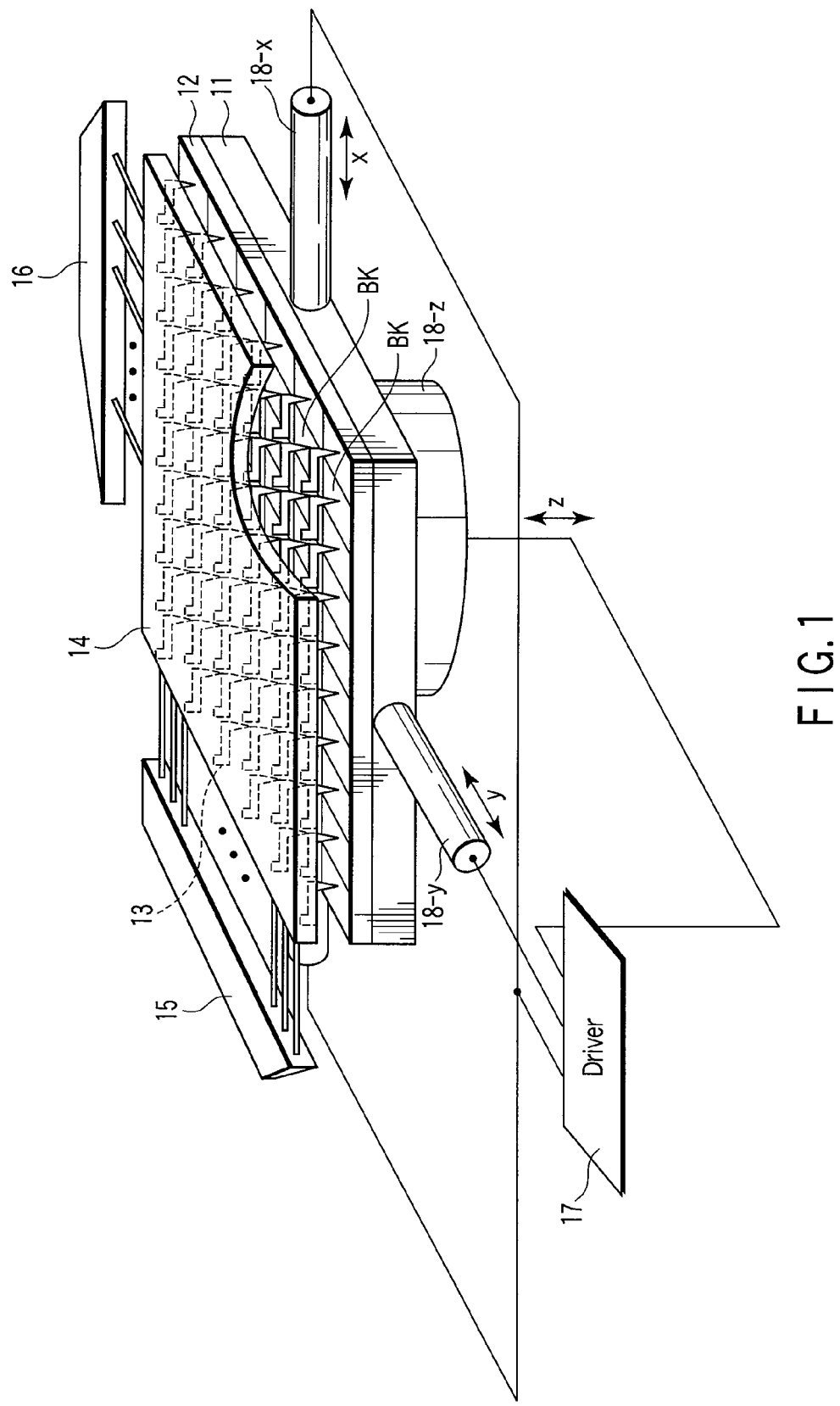
FIG. 1 is an outline view of a probe memory.

An information recording/reproducing device of an aspect of the present invention will be described below in detail with reference to the accompanying drawing.

1. OUTLINE

The invention is applied to an information recording/reproducing device for recording, reproducing, or erasing data in a recording medium, by bringing a head such as a probe closely or tightly to the recording medium, for example, a probe memory, an HDD and other disk memories.

In such information recording/reproducing device, in the invention, the head for reading servo burst signals from servo burst areas is composed of a conductive region formed of a conductive material, and a resistance element for covering the surface of the conductive region.

When recording data and servo burst signals by electrical resistance variations of the recording medium, data can be reproduced at high sensitivity when the difference is greater between the maximum resistivity and minimum resistivity of the recording medium, but it is difficult, conversely, to control the head position at high precision by servo burst signals.

In the invention, in addition to the head for reading the data, a resistance element is added to the head for reading servo burst signals, and therefore sudden changes of servo burst signals, that is, sudden resistance changes of the recording medium can be lessened, and thereby it is intended to satisfy both data reproduction at high sensitivity and position control at high precision.

According to the invention, since position control technology of high precision is established, for example, when combined with the ReRAM recording and reproducing system, an information recording and reproducing device of large capacity and super-high speed, surpassing 1 Tbpsi in recording density can be realized.

2. POSITION CONTROL SYSTEM

An example of head position control system will be explained.

As the head position control system, for example, so-called four-phase zigzag servo burst pattern (A-B-C-D burst pattern) is widely known in the HDD.

When the invention is applied to such disk memory as HDD, the position can be controlled at high precision by this four-phase zigzag servo burst pattern.

Also, when the invention is applied to the probe memory, the position can be controlled at high precision by this four-phase zigzag servo burst pattern.

In the probe memory, the recording medium is disposed oppositely to the probe array formed of a plurality of probes in a matrix form. By a micro-actuator, the recording medium or probe array is driven, and the both are matched in positioning.

For example, when the data area of the recording medium is composed of a plurality of straight tracks, one of the recording medium and probe array is fixed, and the other is moved reciprocally in a first direction of extending the tracks (down-track direction). At this time, the probes are relatively driven in parallel to the recording medium, and scan reciprocally on the tracks of the recording medium.

When scanning the probes reciprocally on tracks, it is required to perform positioning accurately in a second direction perpendicular to the down-track direction (inter-track direction). For this positioning, the four-phase zigzag servo burst pattern can be applied.

For example, servo burst areas are disposed at one of both ends and one end of the recording medium in the track extending direction, and servo burst patterns are recorded in these areas. In addition, one of the probes is scanned on the servo burst area, and the servo burst signal recorded in the servo burst area is read.

In the invention, as described above, a resistance element is added to the probe for reading the servo burst signal. In this case, for example, even if using the ReRAM recording and reproducing system (ReRAM recording medium) extremely large in resistance ratio, $10^3$ or more, between the data bit of recording medium (low resistance portion) and other non-recording area (high resistance portion), owing to this resistance element, the intensity of the servo burst signal is changed smoothly depending on the distance (deviation in position) between the bit (servo burst bit) for composing the servo burst pattern and the probe.

Therefore, if the invention is applied to the probe memory, position control of high precision is realized by this four-phase zigzag servo burst pattern.

3. EMBODIMENTS

Embodiments of the invention will be described below.

(1) Overall View

FIG. 1 shows a probe memory.

Figure 2:
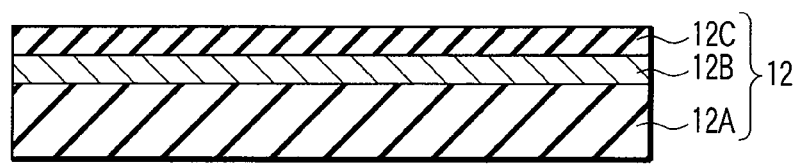
FIG. 2 is a structural diagram of a recording medium.

A medium substrate 12 is placed on a stage 11. The medium substrate 12 is composed of, as shown in FIG. 2, an insulating substrate 12A, a lower electrode 12B disposed on the insulating substrate 12A, and a recording medium 12C disposed on the lower electrode 12B.

The recording medium of the medium substrate 12 is formed of a plurality of blocks BK in an array form. In the diagram, for the ease of understanding, the boundary of blocks BK is indicated, but actually the boundary of blocks BK may not be clearly visible on the recording medium.

On the medium substrate 12, a plurality of probes (heads) 13 are disposed oppositely to the blocks BK on the recording medium of the medium substrate 12. The probes 13 constitute a probe array.

The probes 13 are disposed at one side of a semiconductor substrate 14. Thus, by using the semiconductor substrate 14, for example, by the semiconductor process utilizing the MEMS technology, the probes 13 can be easily formed at one side of the semiconductor substrate 14. The probes 13 are formed of, for example, cantilevers.

Each of the probes 13 has a conductive region formed of a conductive material, and this conductive region is connected to multiplex drivers 15, 16 by means of, for example, LSI wiring.

The medium substrate 12 and the semiconductor substrate 14 are disposed in a nearly parallel state.

In this example, the relative positions of the probe array and the recording medium are controlled by fixing the position of the semiconductor substrate (probe array) 14, and changing the position of the medium substrate 12 by a driver 17. Instead, by fixing the position of the medium substrate 12, the position of the semiconductor substrate 14 may be changed, or both may be driven individually.

On the stage 11, x-y-z actuators 18-$x$, 18-$y$, and 18-$z$ are coupled. The driver 17 drives the actuators 18-$x$, 18-$y$, and 18-$z$, and controls the relative displacement of the probe array and the recording medium (displacement in x, y, z directions).

Part or whole of the actuators 18-$x$, 18-$y$, and 18-$z$ may be used for driving the semiconductor substrate 14.

For example, by coupling the x-y actuators 18-$x$, 18-$y$ to the stage 11, and the z actuator 18-$z$ may be used for driving the semiconductor substrate 14. In this case, the z-direction position of all of the probes 13 can be changed simultaneously, or the z-direction position of the probes 13 may be changed individually in each probe.

Alternatively, by coupling the z actuator 18-$z$ to the stage 11, the x-y actuators 18-$x$, 18-$y$ may be used for driving the semiconductor substrate 14. In this case, the x, y direction position of all of the probes 13 may be changed simultaneously, or the x, y-direction position of the probes 13 may be changed individually in each probe.

The displacement width in x, y-direction may be equal to or smaller than the data area of each probe, that is, the size in x, y-direction of the blocks BK. In the case of parallel driving of the probes 13, the mutual interval of the probes 13 is nearly equal to the displacement width in x, y-direction.

In the case of parallel driving of the probes 13, the data area of the recording medium can be recorded, reproduced, or erased simultaneously in multiple channels.

(2) Probe Structure

An example of the probe structure, a principal section of the invention, will be described below.

Figure 3:
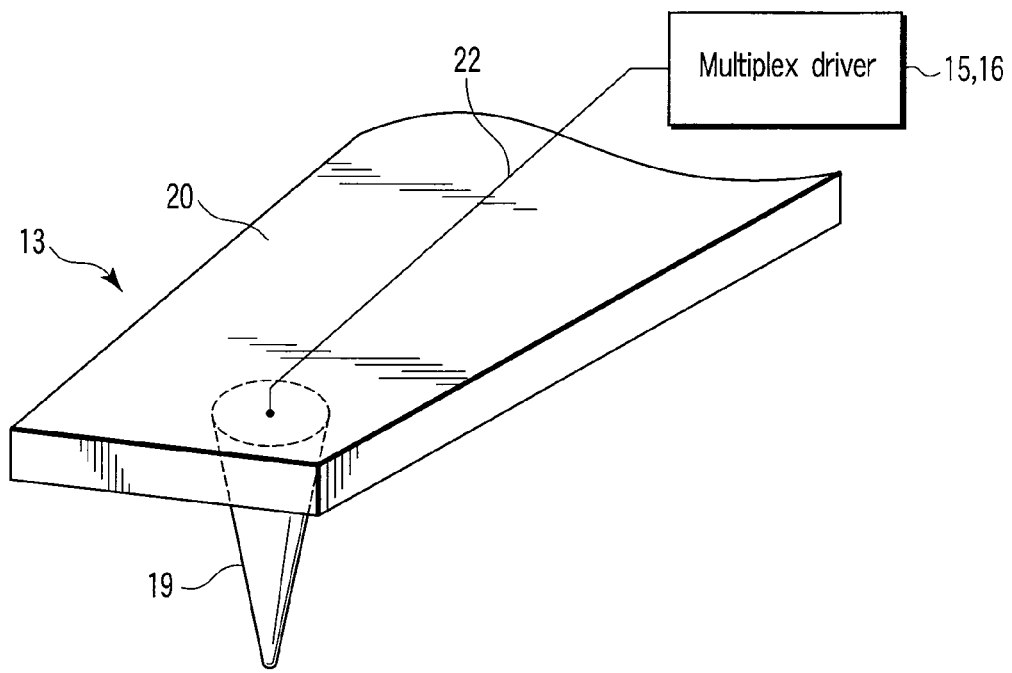
FIG. 3 is a diagram of a first example of a probe for a data area.

FIGS. 3 and 4 show a first example of the probe structure. A probe 13 in FIG. 3 is disposed on a data area of the recording medium, and is used for recording, reproducing, or erasing data. A probe 13 in FIG. 4 is disposed on a servo burst area of the recording medium, and is used for reading servo burst signals.

The probe 13 has a conductive region 19 composed of a conductive material, and is coupled to the end of a cantilever 20. The conductive region 19 has a conical shape, the bottom thereof is attached to the cantilever 20, and the leading end thereof is opposite to the recording medium.

As shown in FIG. 3, the probe 13 on the data area is not provided with a resistance element on the surface of the conductive region 19, while as shown in FIG. 4, the probe 13 on the servo burst area is provided with a resistance element 21 on the surface of the conductive region 19.

The conductive region 19 of the probe 13 is connected to the multiplex drivers 15, 16 by way of LSI wiring 22.

The resistivity of the resistance element 21 is higher than the resistivity of the conductive material of the conductive region 19, and is lower than the maximum resistivity of the recording medium for recording data by electrical resistance changes.

The maximum resistivity of the recording medium is, for example, the resistivity when the recording medium is in an insulated state.

Figure 6:
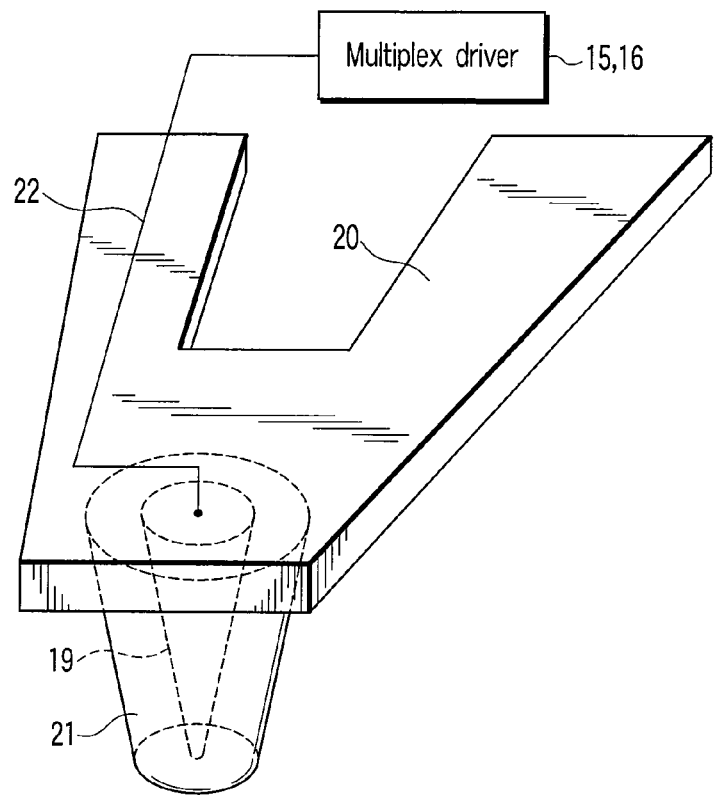
FIG. 6 is a diagram of a second example of the probe for a servo burst area.

FIGS. 5 and 6 show a second example of the probe structure.

A probe in FIG. 5 is disposed on a data area of the recording medium, and a probe in FIG. 6 is disposed on a servo burst area of the recording medium.

What the second example differs from the first example lies in the shape of the cantilever 20. The cantilever 20 is shaped like a stick in the first example, while the cantilever 20 has a V-shape in the second example. The V-shaped cantilever 20 is, as compared with the stick-shaped cantilever 20, decreased in the area of the portion of cantilever (beam), and thus can be reduced in the spring constant. The spring constant is controlled depending on the area and thickness of the cantilever.

Figure 8:
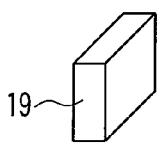
FIG. 8 is a diagram of modified examples of the probe.
Figure 8:
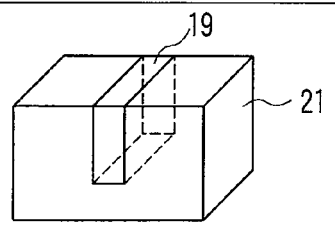
Figure 8:
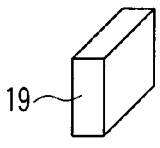
Figure 8:
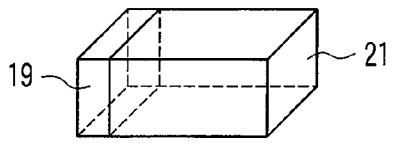
Figure 8:
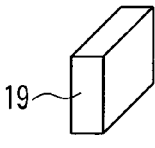
Figure 8:
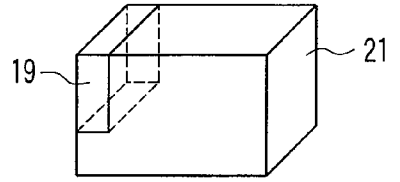
Figure 8:
Figure 8:
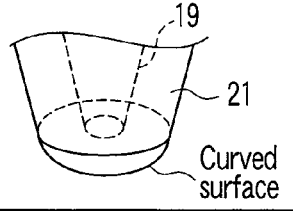

FIGS. 7 and 8 show modified examples of the probe structure.

Herein, examples of shape of the conductive region 19 and the resistance element 21 disposed at the leading end of the probe will be explained. The shape of the cantilever is either one of the first example and the second example.

The embodiment corresponds to the first example and the second example.

It is a feature of this shape that the conductive region 19 of the probes on the data area and address area has a conical shape, that the conductive region 19 and the resistance element 21 of the probe on the servo burst area have a conical shape, and that the leading end of the conductive region 19 is exposed from the resistance element 21.

It is a feature of a first modified example that the conductive region 19 of the probes on the data area and address area has a conical shape, that the conductive region 19 and the resistance element 21 of the probe on the servo burst area have a conical shape, and that the leading end of the conductive region 19 is covered with the resistance element 21.

It is a feature of a second modified example that the conductive region 19 of the probes on the data area and address area has a circular columnar shape, that the conductive region 19 and the resistance element 21 of the probe on the servo burst area have a circular columnar shape, and that the leading end of the conductive region 19 is exposed from the resistance element 21.

It is a feature of a third modified example that the conductive region 19 of the probes on the data area and address area has a circular columnar shape, that the conductive region 19 and the resistance element 21 of the probe on the servo burst area have a circular columnar shape, and that the leading end of the conductive region 19 is covered with the resistance element 21.

It is a feature of a fourth modified example that the conductive region 19 of the probes on the data area and address area has a square columnar shape, that the conductive region 19 and the resistance element 21 of the probe on the servo burst area have a square columnar shape, that the conductive region 19 is enclosed in the resistance element 21, and that the recording medium side surface of the conductive region 19 is exposed from the resistance element 21.

It is a feature of a fifth modified example that the conductive region 19 of the probes on the data area and address area has a square columnar shape, that the conductive region 19 and the resistance element 21 of the probe on the servo burst area have a square columnar shape, that the conductive region 19 is enclosed in the resistance element 21, and that the recording medium side surface of the conductive region 19 is covered with the resistance element 21.

It is a feature of a sixth modified example that the conductive region 19 of the probes on the data area and address area has a square columnar shape, that the conductive region 19 and the resistance element 21 of the probe on the servo burst area have a square columnar shape, that the conductive region 19 is disposed at the end of the resistance element 21, and that the recording medium side surface of the conductive region 19 is exposed from the resistance element 21.

It is a feature of a seventh modified example that the conductive region 19 of the probes on the data area and address area has a square columnar shape, that the conductive region 19 and the resistance element 21 of the probe on the servo burst area have a square columnar shape, that the conductive region 19 is disposed at the end of the resistance element 21, and that the recording medium side surface of the conductive region 19 is covered with the resistance element 21.

It is a feature of an eighth modified example that the leading end (recording medium side surface) of the conductive region 19 of the probe on the servo burst area is covered with the resistance element 21, and that the leading end (recording medium side surface) of the resistance element 21 has a curved surface.

The probe structure may be realized in many other modified examples. For example, the thickness of the resistance elements at both ends in the inter-track direction of the conductive region may be different or nonsymmetrical. The leading end shape of the conductive region and the resistance element is not limited to a flat plane or a curved surface, but may be formed in other desired shape.

(3) Structure of Recording Medium

An example of the structure of the recording medium will be explained.

Figure 9:
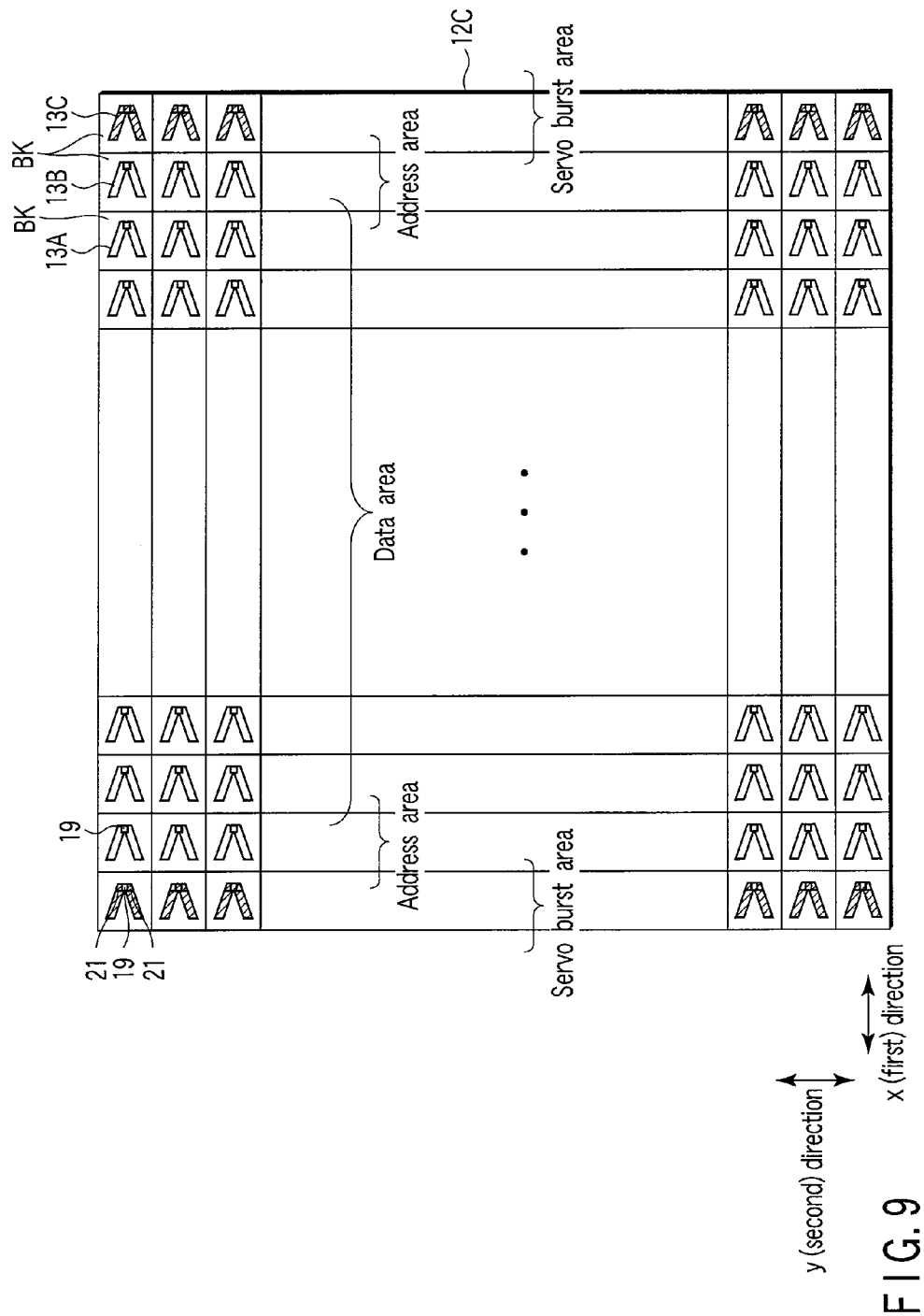
FIG. 9 is a diagram of relation between the recording medium and the probe.

FIG. 9 shows the relation between the recording medium and the probe array.

A recording medium 12C is composed of a plurality of blocks BK disposed in an array (for example, 1024×1024). The size of one block is preferred to be 100 µm×100 µm or less from the viewpoint of recording density.

Corresponding to the blocks BK, a plurality of probes 13A, 13B, 13C are disposed in an array (for example, 1024×1024).

The recording medium 12C is composed of a data area and, an address area and a servo burst area disposed at both ends of the data area in the x-direction (first direction).

As mentioned above, in the invention, a probe 13A on the data area and a probe 13B on the address area are not covered with the resistance element on the surface of the conductive region 19. In contrast, a probe 13C on the servo burst area is covered with the resistance element 21 on the surface of the conductive region 19.

In the example in FIG. 9, the V-shaped probe in the fifth modified example in FIG. 8 is used.

Figure 10:
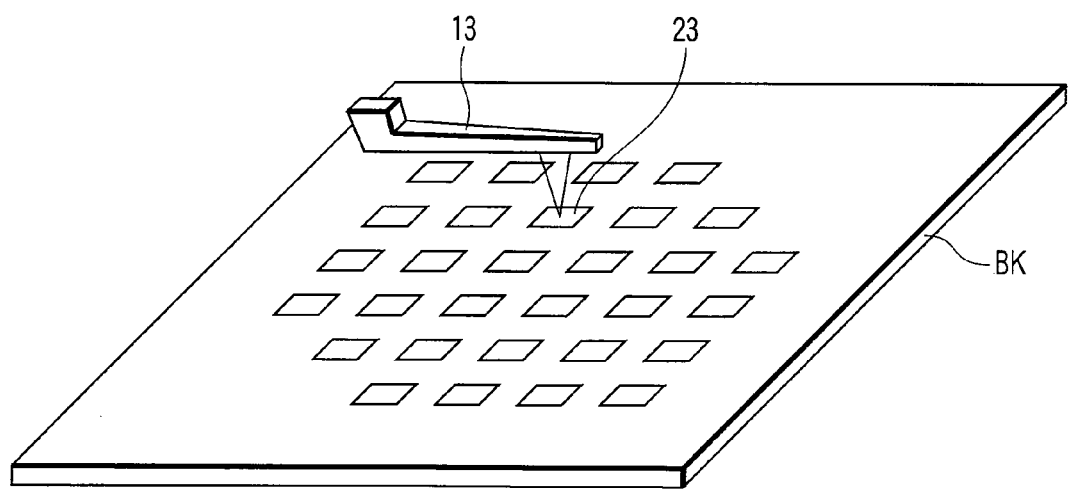
FIG. 10 is a diagram of data bit in one block of the recording medium.

FIG. 10 is a magnified view of the block of the recording medium.

This probe 13 is a stick type.

Data is recorded in the block BK of the recording medium as data bits 23. The data bit 23 has the minimum resistivity (for example, conductivity), and it corresponds, for example, to "0". The non-recording area in which data bit 23 is not formed has the maximum resistivity (for example, insulation), and hence it corresponds, for example, to "1".

Using the probe 13, a data bit 23 is recorded in the block BK of the recording medium, or the data bit 23 is erased to enable the data to be written. The data is read by scanning the probe 13 in the block BK.

Figure 11:
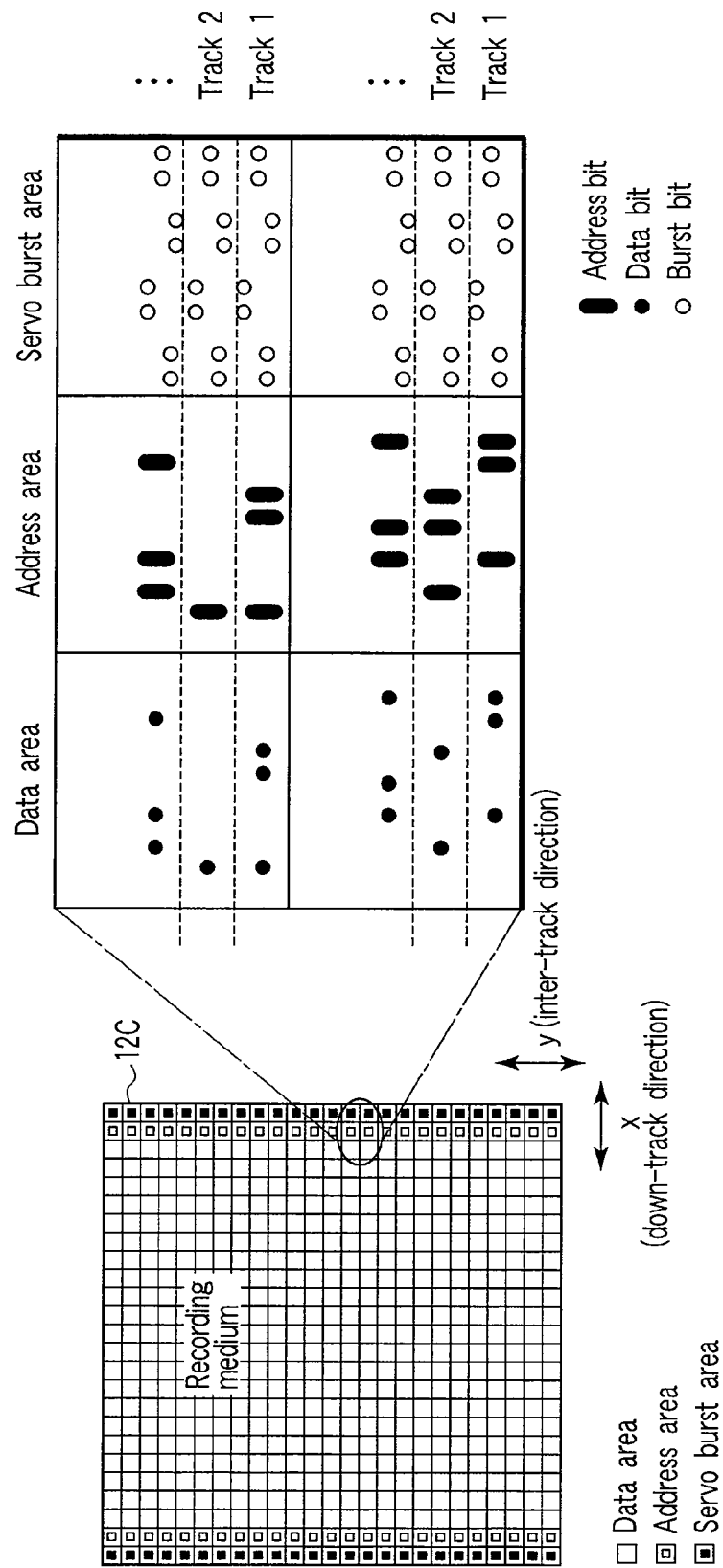
FIG. 11 is a diagram of area divisions and bits on the recording medium.

FIG. 11 shows the detail of the recording medium.

The recording medium 12 is composed of a data area, an address area, and a servo burst area. Each one of the data area, the address area and the servo burst area is composed of a plurality of blocks BK disposed in an array, and each one of the blocks BK has a plurality of tracks.

The tracks are extended in the x-direction (first direction), and arranged sequentially in the y-direction (second direction) perpendicular to the x-direction. Herein, the x-direction is called the down-track direction, and the y-direction is called the inter-track direction.

An address signal is recorded in the address area, and a servo burst signal is recorded in the servo burst area. Either signal shows the position information in the y-direction of the recording medium 12C. That is, the address signal shows the selected track position (range), and the servo burst signal specifies the selected track center (point).

The recording medium 12C may also have a preamble area for synchronizing, in addition to these areas of information.

The data is recorded in the data area as data bit, the address signal in the address area as address bit, and the servo burst signal in the servo burst area as burst bit.

Herein, as the position control system in the y-direction of the recording medium 12C, when the four-phase zigzag servo burst pattern (A-B-C-D burst pattern) employed as the head position control technology of HDD is used, the position can be controlled at high precision by the probe of the invention.

The four-phase zigzag servo burst pattern (burst bits) is disposed at specific intervals in the y-direction. In this example, the interval (burst pitch) corresponds to the width of one track (track pitch).

Figure 12:
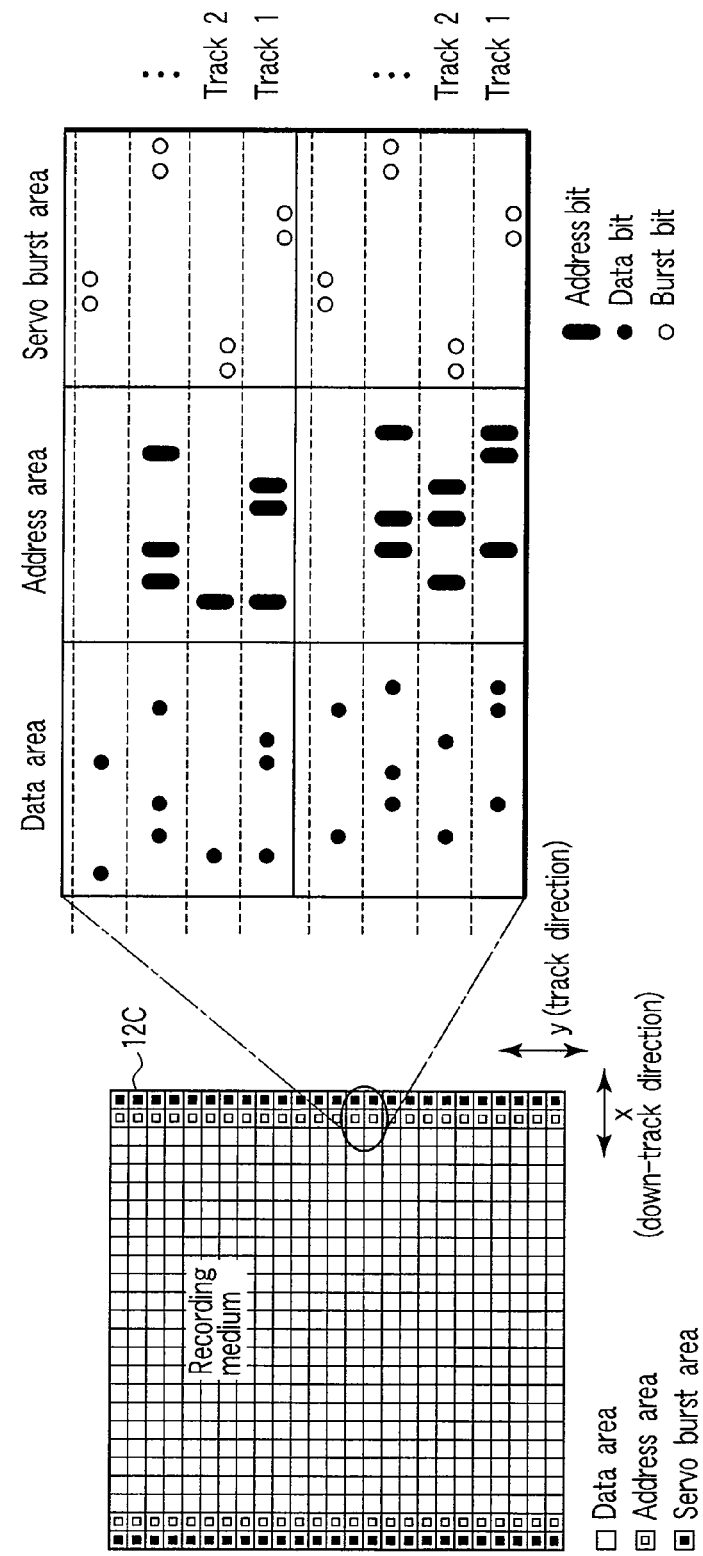
FIG. 12 is a diagram of area divisions and bits on the recording medium.

Instead, for example as shown in FIG. 12, the burst pitch may be disposed at a pitch wider than the track pitch, for example, a pitch corresponding to a width of plural tracks.

In this case, reading errors of servo burst signals due to fluctuations of burst bit size can be reduced.

Conversely, if the burst pitch is too large, the rate of resistance change to the position of inter-track direction is smaller, and the position control is difficult. Therefore, the burst pitch is preferred to be 20-data track width or less.

Concerning the address area and servo burst area, for example as shown in FIG. 13, total Ws of these sizes in the x-direction may be set equal to size Wd of the data area, and the address signal and servo burst signal can be read continuously by using one probe in the address area and servo burst area.

The configuration of the address area and servo burst area is not limited to the illustrated example, but may be realized in various modified forms.

(4) Relation Between Probe and Recording Medium

Relation between the probe and the recording medium will be described below, especially regarding the size.

Figure 14:
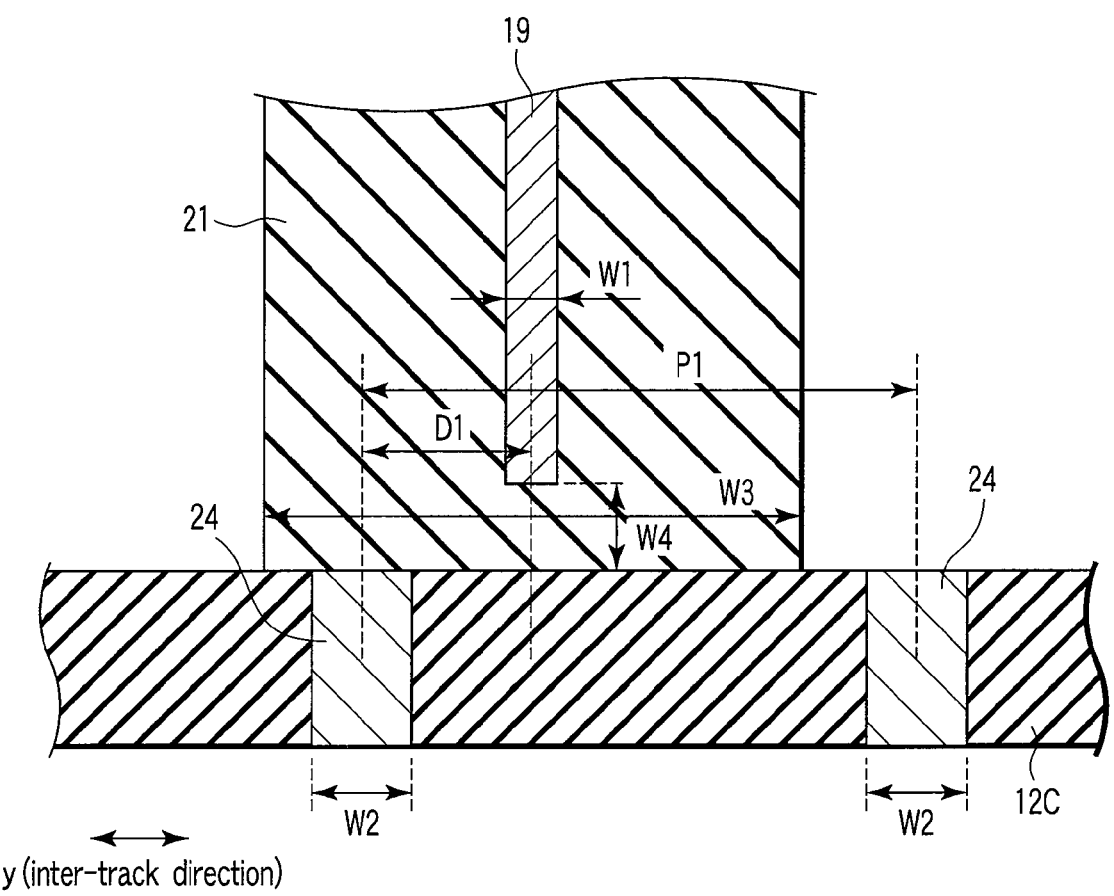
FIG. 14 is a diagram of relation between the probe and burst bit.

FIG. 14 shows a section in the inter-track direction of the probe on the servo burst area.

Figure 15:
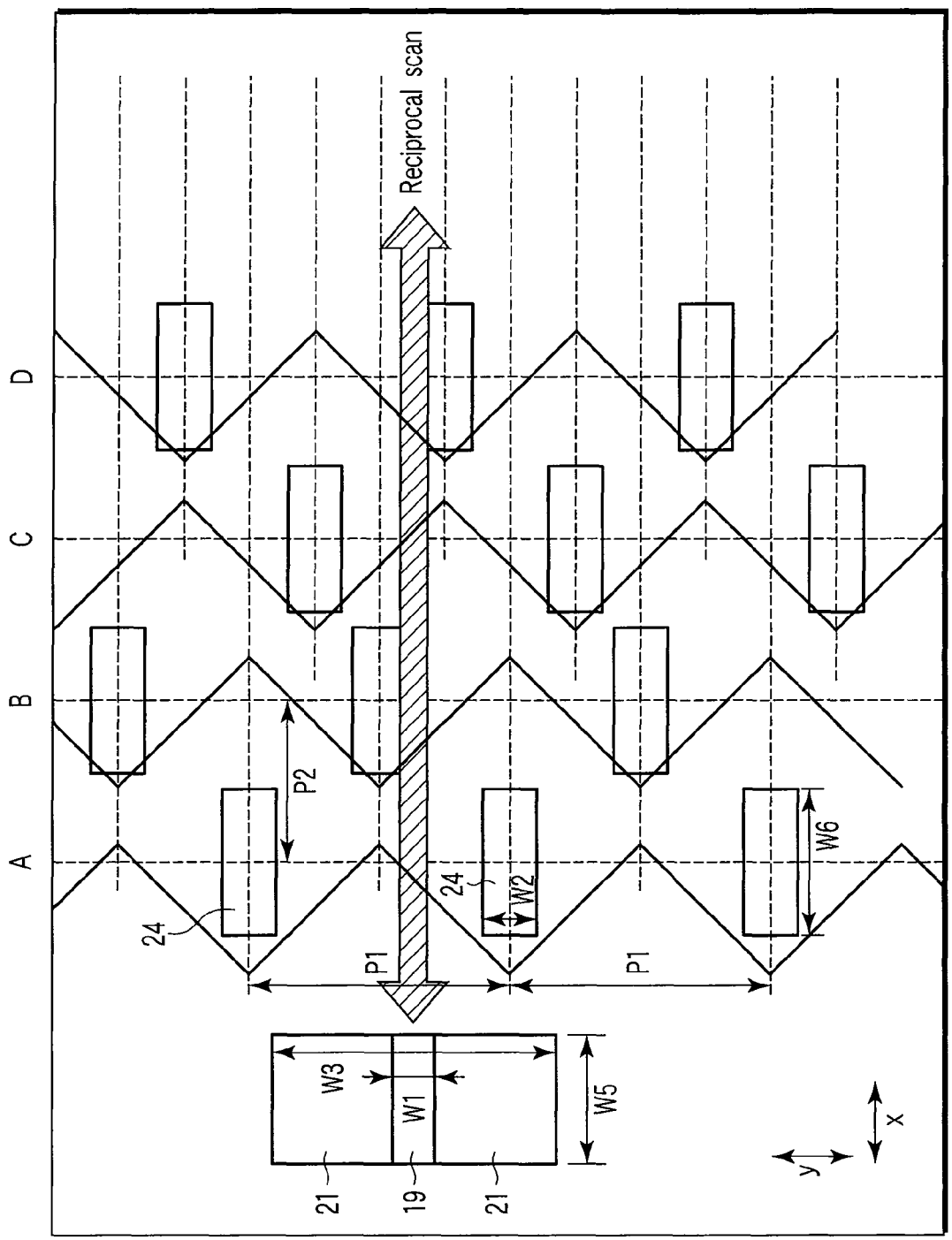
FIG. 15 is a diagram of relation between the probe and burst bit.

FIG. 15 shows the relation between the probe and the burst bits.

In the servo burst area, burst bits 24 are disposed at specific pitch (burst pitch) P1 in the y-direction (inter-track direction). The burst bits 24 constitute a four-phase zigzag servo burst pattern (A-B-C-D burst pattern).

The size of the burst bit 24 is the same as or nearly the same as the size of data bit in the data area. For example, width W2 in the inter-track direction of the burst bit 24 is preferably 20 nm or less, and width W6 in the down-track direction is preferably 50 nm or less.

The minimum size of data bit is determined by the minimum unit of a resistance change position of a metal oxide thin film as the recording medium, that is, by the size of crystal unit lattice, and the minimum value is about 0.4 nm. Hence, the size of the burst bit 24 in the inter-track direction and down-track direction is preferred to be 0.4 nm or more individually.

Width W1 in the inter-track direction of a lower end face (end face of recording medium side) of the conductive region 19 of the probe is preferably less than width W2 in the inter-track direction of the burst bit 24.

Width W3 in the inter-track direction of the lower end face of the probe is preferred to be not less than half of the burst pitch P1, preferably not less than the burst pitch P1. Width W5 in the down-track direction of the lower end face of the probe is preferred to be not more than pitch P2 of servo bits of different phases adjacent in the down-track direction. More preferably, the width W5 is the same as or nearly the same as width W6 in the down-track direction of the burst bit 24.

By defining such size relation, it is possible to minimize the occurrence of plateau (nearly constant current portion) or current undetectable portion in the profile of the servo burst signal (current). Furthermore, current from adjacent burst bit 24 can be suppressed, and position control at high precision by the four-phase zigzag servo burst pattern can be realized.

Herein, the lower end face of the probe refers to the lower end face of the resistance element 21 when the lower end face of the conductive region 19 is covered with the resistance element 21 as shown in FIG. 14, or refers to the lower end face including both the conductive region 19 and the resistance element 21 when the lower end face of the conductive region 19 is exposed from the resistance element 21 as shown in the embodiment in FIGS. 7 and 8, and in the second, fourth, and sixth modified examples.

As shown in FIG. 14, when the shape of the lower end face of the conductive region 19 or the lower end face of the probe is a flat plane, the lower end face is also a flat plane, and thus it is easy to determine the width of the lower end face. In contrast, when the shape of the lower end face of the conductive region 19 or the lower end face of the probe is a curved surface (including spherical surface and cylindrical surface) or an irregular shape, the lower end side is the portion contacting with the recording medium, or the portion closest to the recording medium.

In this case, however, surface undulations of the recording medium due to a grain structure or the like should be ignored.

The pitch in the inter-track direction of data bit in the data area is equal to the track pitch. In contrast, the pitch (burst pitch) P1 in the inter-track direction of burst bit in the servo burst area is set larger than the track pitch described in the paragraph of structure of recording medium.

Considering the position control by the four-phase zigzag servo burst pattern, the burst pitch P1 is set at not less than 1-data track width to not more than 20-data track width, preferably not less than 2-3 data track width to not more than 10-data track width.

The pitch in the inter-track direction of data bit is about twice the size in the inter-track direction of data bit, that is, in the range of 0.8 nm or more to 40 nm or less. Considering this condition, the burst pitch P1 is in the range of 0.8 nm or more to 400 nm or less, and width W3 in the inter-track direction of the lower end face of the probe is preferably 0.4 nm or more.

The maximum value of the width W3 in the inter-track direction of the lower end face of the probe is the block size.

When the block size in the inter-track direction is 100 µm, the width W3 in the inter-track direction of the lower end face of the probe is 100 µm or less.

Preferably, to suppress effects of current from mutually adjacent burst bits 24, the width W3 in the inter-track direction of the lower end face of the probe is preferred to be 2 times or less of the burst pitch P1.

When the width W3 in the inter-track direction of the lower end face of the probe is about half of the burst pitch P1, and a current undetectable portion occurs in the profile of a servo burst signal, and drop of position control detection is anticipated, a burst pattern of different phase may be further increased in the down-track direction in addition to the A-B-C-D burst pattern.

Incidentally, as shown in FIG. 14, when the lower end face of the conductive region 19 is covered with the resistance element 21, width W4 from the lower end face of the conductive region 19 to the lower end face of the resistance element 21 is set at not less than width (0.1 nm) corresponding to one atomic layer or one molecular layer.

Preferably, the maximum value of the width W4 from the lower end face of the conductive region 19 to the lower end face of the resistance element 21 is not more than 10 times of the size in the inter-track direction of the burst bit 24, more preferably nearly the same as the size in the inter-track direction of the burst bit 24.

If this width W4 is too large, the change amount of the current corresponding to the position of the probe is small, and hence an upper limit is necessary as mentioned above.

In other words, the width W4 from the lower end face of the conductive region 19 to the lower end face of the resistance element 21 is determined under the condition that a sufficient difference is present in the currents flowing between the conductive region 19 and the burst bit 24, depending on whether the lower end face of the conductive region 19 is right on the burst bit 24, or away from right on the burst bit 24.

For example, when the width W4 is about 10 times the size in the inter-track direction of the burst bit 24, if position deviation D1 of the probe and the burst bit 24 is about the size in the inter-track direction of the burst bit 24, the current change portion (decrement) is about 10%, and a sufficient current can be obtained.

Therefore, when the lower end face of the conductive region 19 is covered with the resistance element 21, the width W4 from the lower end face of the conductive region 19 to the lower end face of the resistance element 21 is preferred to be in the range of 0.1 nm or more to 200 nm or less.

Meanwhile, concerning the four-phase zigzag servo burst pattern, the burst bit of the same phase (for example, A-burst bit) may be expressed by a plurality of bits arranged in the down-track direction (x-direction). In this case, the burst pitch in the down-track direction should be set not less than the pitch in data bit down-track direction in the data area.

(5) Recording, Reproducing, and Erasing

Methods of recording, reproducing (reading), and erasing will be explained.

Recording, reproducing, and erasing of a data area can be operated by setting the lower electrode 12B in FIG. 2 at ground potential, applying positive or negative potential to the conductive region of the probe, and applying a current between the probe and the lower electrode.

For example, recording is operated by applying a voltage pulse larger in absolute value than a first switching voltage for changing the recording medium from a high-resistance state to a low-resistance state. Erasing is operated by applying a voltage pulse larger in absolute value than a second switching voltage for changing the recording medium from a low-resistance state to a high-resistance state.

Reading is operated by detecting a current flowing between the probe and the lower electrode when a voltage pulse sufficiently smaller than the first and second switching voltages is applied.

In the case of the information recording/reproducing device in FIG. 1, the matrix probe array 13 scans the surface of the recording medium of the medium substrate 12 simultaneously. That is, while positioning the recording medium of the medium substrate 12 and the probe array 13, the probes can be driven in parallel, and thus recording or reproducing at high speed and large capacity can be realized.

More specifically, the probe array 13 scans the surface of the recording medium reciprocally in the x-direction in a width about an interval of probes, and thus the data can be recorded or reproduced continuously. At this time, the servo burst signal recorded in part of the recording medium (servo burst area) is read, and the position in the y-direction is controlled.

The servo burst signal is read in the same manner as reading the data in the data area, by setting the lower electrode of the medium substrate 12 at ground potential, applying a positive or negative potential to the probes, and detecting the current flowing between the lower electrode and the probes.

The probes can be operated individually by using a microactuator formed in the semiconductor substrate, but in this example all probes are operated in batch, and an operation of accessing the data area in the recording medium will be explained with reference to FIG. 1.

First of all, using the multiplex drivers 15, 16, the probe array 13 is moved reciprocally in the x-direction in a specific period, and position information of y-direction is read from the recording medium of the medium substrate 12. The position information of y-direction is transferred to a control circuit (including a driver 17).

The driver 17 drives the x-y-z actuators 18-$x$, 18-$y$, 18-$z$ on the basis of this position information. That is, the stage 11 is moved in the y-direction, and the recording medium of the medium substrate 12 and the probe array 13 are positioned.

When positioning of the two is finished, data is recorded, reproduced or erased simultaneously and continuously in all the probes 13 on the data area.

Data is recorded and reproduced continuously because the probes 13 are moved reciprocally in the x-direction. In addition, recording and reproducing are executed in every track of the data area by sequentially changing the position of the recording medium in the y-direction.

(6) Summary

The recording medium is conductive metallically in the burst bit recorded portion, but is an insulator in a non-recorded area.

Accordingly, if attempted to read a servo burst signal by a probe not coated with a resistance element, for example as shown in FIG. 17, the signal intensity changes suddenly depending on whether the probe is present on the burst bit or not, and position control at high precision is disabled.

In the probes of the invention, in contrast, by coating the surface of the conductive region with the resistance element, the intensity of the servo burst signal is changed smoothly, for example as shown in FIG. 16, depending on position deviation (relative position) of the probes and the burst bits.

Thus, according to the invention, linearity of the servo burst signal is assured due to position deviation of the probes and the burst bits, and position control at high precision is thus enabled.

4. MATERIAL EXAMPLES

Material examples will be explained.

The recording medium is formed of one material selected, for example, from the following group.

1. $NiO$, $TiO_2$, $Cu_xO$, $Fe_2O_3$, $CoO$, $Nb_2O_5$, $MnO$, $Al_2O_3$, $Ta_2O_5$, $MgO$, $ZrO_2$, $ZnO$, $HfO$, $WO_3$.

2. $Pr_xCa_{1-x}MnO_3$, $SrTiO_3$ doped with Cr, $SrZrO_3$ doped with Cr, $SrTiO_3$ doped with Nb, $AMn_2O_4$ (A=Zn, Mg, Co, Cu, Fe), $ACo_2O_4$ (A=Zn, Mg, Cu), $ZnCo_2O_4$ doped with Al, $ATiO_3$ (A=Ni, Fe, Co).

3. $Cu_2S$, $AgGeS$, $CuGeS$, $ZnCdS$

The resistance element for coating the conductive region of the probes (head) is formed of any one of diamond-like carbon doped with boron, nitrogen or phosphorus, silicon doped with boron, nitrogen or phosphorus, conductive oxide, and conductive nitride.

The resistance element may be also formed of any one of covalent bonding crystal, and ionic crystal not containing divalent or lower ion.

The resistance element may be also formed in a stacked structure composed of two or more of these materials. In this case, plural materials are regarded as a composite body, and the resistivity of the composite body is preferably higher than the resistivity of the conductive region of the probes, and lower than the maximum resistivity of the recording medium.

5. EXAMPLES

As shown in FIGS. 3 and 4, the length of the cantilever 20 is about 10 μm, and the interval of cantilevers 20 is 20 μm. An array of 1024×1024 is composed by using the cantilevers 20. A conductive region 19 composed of a conductive material is attached to the leading end of the cantilever 20.

The conductive region 19 is formed of silicon having impurities doped at high concentration, and is formed in a conical shape. The diameter of the leading end of the conductive region 19 is about 10 nm. The resistance element 21 is made of diamond-like carbon doped with boron at conductivity lower by about two digits as compared with the conductive region 19.

The probe 13C on the servo burst area (FIG. 9) is coated with the resistance element 21 at the lower end face of the conductive region 19. The probe 13A on the data area and the probe 13B on the address area are not coated with a resistance element on the surface of the conductive region 19.

The thickness of the resistance element 21 coating the lower end face of the conductive region 19 is about 3 nm, and the width of the resistance element 21 coating the side face of the conductive region 19 is about 20 nm.

The width in the inter-track direction of the lower end face of the probe is about 50 nm.

As shown in FIG. 12, the surface of the recording medium 12C is divided into 1024×1024 blocks. The first column from both ends of down-track direction of the recording medium 12C is a servo burst area, and the second column is an address area.

In the servo burst area, a servo burst pattern (burst bits) is recorded. The width in the inter-track direction of burst bits is about 10 nm, and the pitch in the inter-track direction is about 50 nm.

As shown in FIG. 1, the medium substrate 12 is moved reciprocally in the x-direction at a frequency of about 1 kHz and amplitude of about 20 μm, and is positioned in the y-direction on the basis of servo burst signal, and data is recorded, reproduced, and erased.

The medium substrate 12 is a square of 100 mm×100 mm as shown in FIG. 2, and the insulating substrate 12A is a silicon substrate of about 0.5 mm in thickness having an insulating layer on the surface. The lower electrode 12B has a stacked structure of a Ti adhesive layer of about 5 nm in thickness and a Pt electrode layer of about 200 nm in thickness. The recording medium 12C is made of $ZnMn_2O_4$ in a thickness of about 10 nm.

The layer of $ZnMn_2O_4$ is formed by RF magnetron sputtering in a gas atmosphere of, for example, Ar: 95%, $O_2$: 5%, at substrate temperature of 300 to 600° C. The composition of a target material of sputtering is controlled so as to deposit ZnM2O4.

In the invention, the positioning precision was evaluated as follows.

The probe 13B (probe for address) on the address area is moved straightly onto an unrecorded portion in the servo burst area, and is lightly brought into contact with the surface of the recording medium. Later, a pulse voltage of 1 V is applied between the lower electrode and the probe, in a width of 10 nsec, and a burst bit (low resistance region) is recorded.

The burst bit is recorded by using a probe not coated with a resistance element.

The burst bit may be also recorded by using a probe array exclusively for burst bit recording.

The probe 13C on the servo burst area (FIG. 9), that is, the probe for servo was moved into the servo burst area. In a width of 10 nsec, a pulse voltage of 0.1 V was applied, and the relation between the position deviation amount of the probe for servo and the burst bit, and the current at this time was determined.

As a result, as shown in FIG. 16, as the probe for servo was departed from the burst bit, the current decreased smoothly.

A similar test was conducted on the probe for servo not coated with a resistance element. As a result, as shown in FIG. 17, a current was observed only near right above the burst bit. In other position, however, since the resistance of the recording medium was too high, only feeble current was observed.

6. APPLICATION EXAMPLES

The invention can be applied to an information recording/reproducing device for recording, reproducing and erasing data in a recording medium by moving the head such as the probe closely or tightly to the recording medium, for example, probe memory, HDD, and other disk memories.

According to the invention, since the position control technology of high precision is established, for example, by combining with the ReRAM recording and reproducing system, an information recording/reproducing device of large capacity and super high speed surpassing the recording density of 1 Tbpsi can be realized.

7. CONCLUSIONS

According to the invention, even in the resistance-change-type probe memory having extremely large on/off ratio of resistance change of $10^3$ or more, positioning can be executed with sufficiently high precision. That is, the invention realizes an information recording/reproducing device having an extremely high recording density not achieved in the prior art, with a very simple structure, and brings about outstanding industrial merits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording/reproducing device comprising:
   a first head and a second head each having a conductive region formed of a conductive material, the conductive material having a top surface connected to a cantilever and a side surface;
   a recording medium having a data area from which data is read by the first head, and a servo burst area from which a servo burst signal is read by the second head;
   a driver for positioning the first head and the recording medium based on the servo burst signal; and
   a resistance element for covering the side surface of the conductive region of the second head.

2. The information recording/reproducing device according to claim 1, wherein resistivity of the resistance element is higher than resistivity of the conductive material, and lower than maximum resistivity of the recording medium.

3. The information recording/reproducing device according to claim 1, wherein the first and second heads are driven in parallel.

4. The information recording/reproducing device according to claim 1, wherein the data area is formed of blocks arranged in an array form, and each of the blocks has tracks extending in a first direction, and arranged in a second direction perpendicular to the first direction.

5. The information recording/reproducing device according to claim 4, further comprising:
   heads including the first and second heads disposed so as to be faced to the blocks,
   wherein data is recorded, reproduced and erased in the data area simultaneously in multiple channels by parallel driving of the heads.

6. The information recording/reproducing device according to claim 4, wherein a width of the second direction at a lower end face of the conductive region of the second head is equal to or smaller than a size of burst bits recorded in the servo burst area, and is equal to or larger than half of a pitch in the second direction of the burst bits.

7. The information recording/reproducing device according to claim 6, wherein the width is equal to or larger than the pitch in the second direction of the burst bits, and is equal to or smaller than twice the pitch.

8. The information recording/reproducing device according to claim 4, wherein a pitch in the second direction of burst bits recorded in the servo burst area is larger than a track pitch as a pitch of the tracks.

9. The information recording/reproducing device according to claim 4, wherein the first and second heads move reciprocally in the first direction in a specific period, and the driver determines positioning of the first head and the recording medium in the second direction.

10. The information recording/reproducing device according to claim 1, wherein the recording medium is composed of one of metal oxide and metal chalcogenide compound.

11. The information recording/reproducing device according to claim 1, wherein the recording medium is composed of one of the materials selected from the group consisting of NiO, $TiO_2$, $Cu_xO$, $Fe_2O_3$, CoO, $Nb_2O_5$, MnO, $Al_2O_3$, $Ta_2O_5$, MgO, $ZrO_2$, ZnO, HfO, and $WO_3$.

12. The information recording/reproducing device according to claim 1, wherein the recording medium is composed of one of the materials selected from the group consisting of $Pr_xCa_{1-x}MnO_3$, $SrTiO_3$ doped with Cr, $SrZrO_3$ doped with Cr, $SrTiO_3$ doped with Nb, $AMn_2O_4$ (A=Zn, Mg, Co, Cu, Fe), $ACO_2O_4$ (A=Zn, Mg, Cu), $ZnCo_2O_4$ doped with Al, and $ATiO_3$ (A=Ni, Fe, Co).

13. The information recording/reproducing device according to claim 1, wherein the recording medium is composed of one of the materials selected from the group consisting of $Cu_2$, AgGeS, CuGeSs, and ZnCdS.

14. The information recording/reproducing device according to claim 1, wherein the resistance element is composed of diamond-like carbon doped with at least one of boron, nitrogen and phosphorus.

15. The information recording/reproducing device according to claim 1, wherein the resistance element is composed of silicon doped with at least one of boron, nitrogen and phosphorus.

16. The information recording/reproducing device according to claim 1, wherein the resistance element is composed of conductive oxide.

17. The information recording/reproducing device according to claim 1, wherein the resistance element is composed of conductive nitride.

18. The information recording/reproducing device according to claim 1, wherein the resistance element is composed of any one of covalent bonding crystal, and ionic crystal not containing divalent or lower ion.

19. The information recording/reproducing device according to claim 1, wherein the first and second heads comprise probes including cantilevers.

20. The information recording/reproducing device according to claim 1, wherein a four-phase zigzag servo burst pattern is recorded in the servo burst area.

* * * * *